Patented Jan. 23, 1940

2,187,745

UNITED STATES PATENT OFFICE 2,187,745

PROCESS FOR HYDROGENATING AMIDES AND IMIDES TO AMINES

Wilbur A. Lazier, Marshallton, Del., assignor to E. I. du Pont de Nemours & Company, Wilmington, Del., a corporation of Delaware No Drawing. Application September 1, 1934, Serial No. 742,476

8 Claims. (Cl. 260—319)

This invention relates to catalytic processes for the production of organic amines. More particularly, it relates to a process for the production of amines by the catalytic hydrogenation of carboxylic acids, their esters, and their anhydrides in intimate association with ammonia and its alkylated and arylated derivatives. Specifically this invention relates to and has as its principal object the application of catalytic hydrogenation to the formation of amines and other reduced nitrogen compounds from acid amides and acid imides.

This application is a continuation in part of copending applications Serial No. 584,574, filed January 2, 1932; and Serial No. 456,298, filed May 27, 1930, which matured into U. S. Patent 2,077,421 on April 20, 1937.

The preparation of amines by organic chemical methods as from the alcohols or alkyl halides, for example, is well known. Several attempts have been made with varying degrees of success, to effect the chemical reduction of amides to amines. Reports in the technical literature are contradictory as regards the yields obtainable when employing sodium in absolute alcohol as the reducing agent. The direct catalytic reduction of amides and ammonium salts with hydrogen appears to be a particularly difficult procedure. Although Mailhe (Bull. Soc. Chim. (3) 35, 614 (1906)) obtained evidence of the formation of low molecular weight amines by passing the vapor of acetamide and hydrogen over a nickel catalyst at atmospheric pressure, the yields have not been recorded and the work has not, to my knowledge, been duplicated. The failure of other investigators to obtain technically successful yields of amines from amides is further evidenced by the fact that the amines corresponding to the common high molecular weight acids, although of value in the arts, have never become commercially available.

This invention has as an object the production of organic amines by the catalytic hydrogenation of acid amides, imides, and mixtures of carboxylic acids, their esters, or their anhydrides with ammonia and its alkylated or arylated derivatives. A still further object is the effecting of this conversion by the use of high temperatures and pressures in the presence of an excess of hydrogen and of catalysts consisting of single and composite hydrogenating metals or metal oxides. Other objects will appear hereinafter.

The objects are accomplished by the following invention, which in its general aspects comprises heating the compound to be hydrogenated in a suitable autoclave or high pressure tube, together with an excess of hydrogen, in contact with a suitable hydrogenation catalyst at elevated temperatures and pressures; or by permitting the compound to be converted, admixed with excess hydrogen, to flow over a hydrogenation catalyst in a continuous manner in either the liquid or vapor phase. The following examples illustrate in detail the preferred embodiments of the invention without limiting the invention thereto.

EXAMPLE I

A hydrogenation catalyst was prepared as follows: 23 g. of cadmium nitrate, 24 g. of copper nitrate, and 243 g. of zinc nitrate were dissolved in 500 cc. of water and mixed at ordinary temperature with an equal volume of water containing 126 g. of ammonium bichromate and 75 cc. of 28% ammonium hydroxide. After stirring, the mixture was exactly neutralized with additional ammonium hydroxide and allowed to settle. After several washes by decantation, the precipitate was dried, ignited at 400° C. and compressed into tablets or grains suitable for use in a catalytic gas apparatus.

One hundred cubic centimeters of this catalyst was placed in a high pressure tube and heated to 390° C. At this temperature and at a pressure of 3000 lbs. per sq. in., 400 cc. of acetanilide (20% solution in aniline) was pumped over the catalyst together with an excess of hydrogen flowing at the rate of about 10 cu. ft. per hour. The liquid reaction products were condensed under pressure, separated from the excess gas and distilled. A yield of 25% of monoethyl aniline was obtained.

EXAMPLE II

A supported active nickel catalyst was prepared by dissolving 185 g. of metallic nickel in a mixture of 450 g. of 70% nitric acid and 450 g. of water. The resulting solution was filtered from foreign material, diluted to 2 liters with water, and 200 g. of kieselguhr added. A solution of 370 g. of sodium bicarbonate (or its equivalent of sodium carbonate) in 6 liters of water was slowly added to the nickel nitrate solution containing kieselguhr with vigorous stirring. The resulting precipitate was washed several times with cold water, filtered, dried, and then reduced in hydrogen at 450° C. A catalyst so prepared contains approximately 24% of elementary nickel.

A steel tube suitable for use at high pressures and arranged for either external or internal heating was charged with 150 g. of phthalimide, 100 g. of dioxane, and 20 g. of nickel catalyst prepared as described above. The tube was then heated to 265° C. under a hydrogen pressure of 3000 lbs. per sq. in. for 2½ hours while continuously shaking the tube. After releasing the pressure, the contents of the tube were discharged and the solution filtered to remove the catalyst. A simple crystallization of the solution gave 80% yields of phthalimidine melting at 150° C., which readily formed the nitroso derivative (M. P. 156° C.). A more prolonged period of hydrogenation, or hydrogenation under the above conditions of a purified sample of phthalimidine gave an appreciable quantity of dihydroisoindol (B. P. 95 to 105° C. at 35 mm.; nitroso derivative M. P. 95 to 96° C.) in which the oxygen was completely removed from the nitrogen-containing ring.

EXAMPLE III

Fifty-three grams of succinimide, 150 g. of cyclohexane and 14 g. of nickel catalyst prepared as described in Example II were heated in a steel shaker-tube to 225° C. with continuous agitation under 3000 lbs. per sq. in. pressure of hydrogen for from 3 to 5 hours. After cooling and filtering, the reaction mixture was distilled and there was found 2 g. (5%) of pyrrolidine (B. P. 88° C.) and 40 g. (80%) of butyrolactam (B. P. 110 to 115° C. at 5 mm.), otherwise known as succinimidine.

EXAMPLE IV

A copper chromite hydrogenation catalyst was prepared by dissolving 428 g. of copper nitrate and 176 g. of chromic anhydride ($CrO_3$) in 2750 cc. of water. To this solution 85 g. of anhydrous ammonia was added with stirring in order to precipitate copper-ammonium chromate. The precipitate was filtered, dried, ignited at 425 to 450° C. and then extracted with 10% acetic acid solution. After washing and drying, the metallic chromite catalyst was screened to 18 mesh and was ready for use in the hydrogenation of amides.

Twelve grams of this catalyst, 75 g. of lauramide and 150 g. of decahydronaphthalene were placed in a steel autoclave and heated to 270° C. with agitation under 3000 to 4000 lbs. per sq. in. hydrogen pressure for 6 hours, the pressure being maintained by occasional fresh additions of gaseous hydrogen. The tube was then cooled and the pressure released. After pouring out the contents, the tube was thoroughly washed with alcohol. The solution was then filtered to remove the catalyst and the alcohol distilled off at atmospheric pressure. The decahydronaphthalene was next distilled at 30 mm. pressure, boiling under these conditions at 90 to 95° C. After all of the hydrocarbon had been removed, the pressure of the distillation was lowered to 2 mm., whereupon monododecylamine (M. P. 22 to 25° C.) distilled over at 95 to 100° C. The still residue was cooled, dissolved in ether, and treated with a stream of dry HCl gas. Didodecylamine hydrochloride was thus precipitated very rapidly, and was filtered off, washed with warm ether, dried, and then treated with aqueous alkali to liberate the free amine (M. P. 55° C.). From a typical run there was isolated 21 g. (30% yield) of monododecylamine and 29.5 g. of didodecylamine hydrochloride (equivalent to a 40% yield of didodecylamine). The remainder consisted of a small amount of unchanged lauramide, a little dodecyl lauramide, and probably some tridodecylamine.

EXAMPLE V

A composite hydrogenation catalyst was prepared as follows: To a solution consisting of 52 g. of barium nitrate and 436 g. of copper nitrate trihydrate dissolved in 1600 cc. of water, there was added with stirring a second solution consisting of 252 g. of ammonium bichromate and 300 cc. of 28% ammonium hydroxide dissolved in 1200 cc. of water. The precipitate of mixed chromates was filtered, dried, and ignited at 400° C. for 4 hours. The resulting mixed chromites were then extracted with dilute acetic acid, washed, dried, and powdered.

A shaker-tube was charged with 75 g. of lauramide, 150 g. of decahydronaphthalene and 12 g. of the catalyst prepared as described above. Compressed hydrogen was then introduced into the tube until a pressure of 3000 lbs. per sq. in. was obtained. The tube contents were heated to 270° C. for 6 hours with constant shaking. Following the procedure outlined in Example V, there was obtained a 30% yield of dodecylamine and a 55% yield of didodecylamine.

EXAMPLE VI

A high pressure autoclave was charged with 3110 g. of lauramide and 373 g. of nickel catalyst prepared as described in Example II. The reaction mass was heated to 200 to 225° C. with stirring, and compressed hydrogen was introduced until a pressure of 3000 lbs. per sq. in. had been reached. After 10 hours of reaction under these conditions, the hydrogen absorption became very slow and the autoclave was allowed to cool. The resulting solid product was dissolved in ethyl alcohol, filtered hot to remove the catalyst, and then cooled until crystals formed. In a typical experiment there separated 50% of a material with a melting point of 78 to 80° C., which on analysis proved to be dodecyl lauramide. The analytical values were: Found: $N_2$, 4.05%; C, 78.6%; $H_2$, 13.5%. Calculated for dodecyl lauramide: $N_2$, 3.82%; C, 78.4%; $H_2$, 13.35%. Further identification was established by hydrolysis with alcoholic potash to lauric acid and dodecylamine and by further hydrogenation of the material to didodecylamine. Yields of dodecyl lauramide comparable to those given above can also be obtained by the use of the copper-barium-chromite catalyst described in Example V.

EXAMPLE VII

Seventy-five grams of dodecyl lauramide prepared as described in Example VI, 150 g. of dioxane, and 12 g. of the copper chromite catalyst prepared as described in Example IV, were heated to 250 to 260° C. in a steel shaker-tube under a hydrogen pressure of 3,000 lbs. per sq. in. for 4½ hours while maintaining constant agitation. After cooling and filtering out the catalyst the solution was evaporated to dryness and the residue recrystallized from 500 cc. of ethyl alcohol. By this procedure, there was obtained 46.5 g. of didodecylamine corresponding to a 64.5% yield calculated on the dodecyl lauramide used.

EXAMPLE VIII

A steel shaker-tube charged with 75 g. of lauramide, 150 g. of decahydronaphthalene and 12 g. of the nickel catalyst of Example II, were heated to 260 to 280° C. under a hydrogen pressure of 3000 to 4000 lbs. per sq. in. for 6 hours with good agitation in a mechanical shaker. After stripping the solvent from the reaction mixture there was isolated 8 g. of dodecylamine and 11 g. of didodecylamine. The residue consisted largely of dodecyl lauramide.

EXAMPLE IX

One hundred fifty grams of decahydronaphthalene, 75 g. of lauramide, 20 g. of anhydrous ammonia, and 12 g. of the nickel-onkieselguhr catalyst already described were heated with good agitation at 260 to 280° C. under 3,000 to 4,000 lbs. per sq. in. hydrogen pressure for 7 hours. Following the procedure described in Example V, there was isolated a 44% yield of monododecylamine and a 24% yield of didodecylamine.

EXAMPLE X

The contents of a shaker-tube consisting of 75 g. of capric acid (B. P. 154 to 165° C. at 20 mm.), 150 g. of decahydro-naphthalene, 10 g. of anhydrous ammonia, and 12 g. of the copper chromite catalyst described in Example IV, were heated with shaking at 260 to 270° C. under 4000 lbs. per sq. in. hydrogen pressure for 4 hours. After filtering out the catalyst, the reaction mixture was vacuum distilled. The fraction boiling between 95 and 120° C. at 30 mm. readily formed a solid hydrochloride in anhydrous hydrocarbon solvents in an amount corresponding to a 15% yield of decylamine.

EXAMPLE XI

The following mixture was charged into an alloy steel tube: 75 g. of ammonium laurate (prepared from lauric acid and anhydrous ammonia in absolute alcohol), 150 g. of decahydronaphthalene and 12 g. of the copper chromite catalyst prepared as described in Example IV. The temperature of the reaction mixture was raised to 275° C. and compressed hydrogen admitted to the tube until a pressure of 4000 lbs. per sq. in. had been reached. After shaking the reaction mixture for 7 hours at a relatively constant temperature and pressure, the tube was cooled and its contents discharged. The catalyst was removed by filtration, and on distillation there was found 23% of monododecylamine. Treatment of the still residue dissolved in ether with dry HCl gas gave 5 to 10% of didodecylamine hydrochloride.

EXAMPLE XII

Seventy-five grams of lauramide, 150 g. of mineral oil (pharmaceutical grade) and 12 g. of the copper-barium-chromite catalyst described in Example V were placed in a steel shaker-tube and heated to 270° C. under a hydrogen pressure of 3000 to 4000 lbs. per sq. in. After 7 hours of shaking at the above-mentioned temperature and pressure, the tube was cooled and the reaction mixture removed. After filtering off the catalyst, distillation gave 9 g. (13%) of dodecylamine.

The present invention is applicable to the hydrogenation of a wide variety of acid amides to the corresponding amines, and contemplates the application of the methods of the invention to the treatment of not only the simple aromatic, alicyclic, and aliphatic monocarboxylic acid amides and dicarboxylic acid imides, but as well to the substituted amides in which one or both of the hydrogen atoms attached to the amide nitrogen are replaced by an alkyl or aryl group, or a combination of both alkyl and aryl groups. A few of the variations of the invention may be illustrated as follows:

Case I

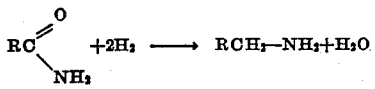

In this case we have simple acid amides wherein R is either an alkyl or aryl radical. When R is an alkyl group, it may contain one or more carbon atoms fully saturated with hydrogen or containing some unsaturated linkages. Representative compounds falling under Case I are propionyl amide, acetamide, caproyl amide, lauramide, benzamide, stearamide, oleyl amide, etc.

Case II

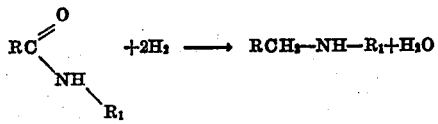

R is defined as in Case I and $R_1$ may be either a group of aliphatic character such as cyclohexyl, ethyl, methyl, dodecyl, etc., or an aryl group such as phenyl, tolyl, benzyl, etc. Acetanilide, dodecyl lauramide, etc., are typical amides which in this case are hydrogenated to the corresponding secondary amines.

Case III

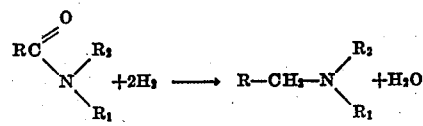

In Case III, R again remains the same and $R_1$ and $R_2$ may be the same or different alkyl or aryl groups of the type outlined above.

The nitrogen derivatives of the dicarboxylic acids may include the imides or cyclic amides in which one molecule of ammonia is combined with two carboxyl groups. Here we have Case IV

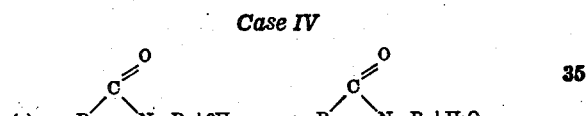

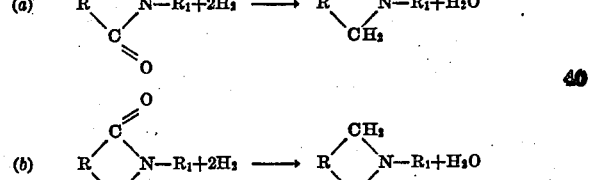

where R may be an aryl or alkyl grouping of carbon atoms, and $R_1$ may be a hydrogen atom, or an alkyl or aryl group. Typical examples of imides falling under this case are phthalimide, wherein R is aromatic, and succinimide, wherein R is aliphatic. It is also possible according to the present invention to convert diamides such as Case V

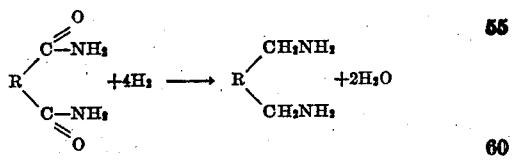

in cases where the structure of the compound is such that ring formation does not take place readily. Here also the hydrogen attached to the nitrogen atoms can be replaced by aryl or alkyl groups, giving combinations similar to those obtainable in the case of the monocarboxylic acids illustrated above. It should be noted, however, that a great number of these diamides at the temperature of hydrogenation lose ammonia and form the cyclic imides, which on hydrogenation result in the formation of heterocyclic lactams and heterocyclic amines.

Instead of starting with preformed amides, I may as an alternative use for the hydrogenation the free mono or dicarboxylic acids in the presence of sufficient ammonia to give the ammonium salts which are then converted to the corresponding amines, presumably through the amide as an intermediate stage. Instead of ammonia the alkyl or aryl derivatives of ammonia such as methylamine, diethylamine, aniline, etc., may be used. These ammonium salts or substituted ammonium salts may be prepared as pure compounds and then hydrogenated, or the necessary primary ingredients may be mixed with the catalyst and hydrogenated at suitable temperatures and pressures.

Furthermore, in place of the free acid, the derivatives of the acids such as the esters and anhydrides, may be mixed with ammonia or its alkylated or arylated derivatives and then hydrogenated. Suitable esters for hydrogenation in the presence of ammonia or amines include the simple esters such as methyl acetate, ethyl stearate, ethyl benzoate, etc., and the naturally occurring glycerides such as tributyrin, coconut oil, corn oil, sperm oil, olein, etc. Whenever the hydrogenation process includes the free acid, the ester of the acid, or the acid anhydride in admixture with ammonia, an exact chemical equivalent of ammonia or an excess of ammonia can be used. It has been found preferable, however, to employ ammonia in excess when a high yield of primary amine is desired. Furthermore, the addition of a reasonable excess of ammonia to the hydrogenation mixture, even in the case of a pure preformed amide, aids materially in the formation of a high yield of the primary amine, because it lessens the tendency of the amine formed to react with itself or unchanged amide with the evolution of free ammonia. The amount of ammonia in excess may vary from as low as 5% to as much as 1000%. An average preferred value is approximately a 100% excess of ammonia since smaller amounts fail to produce the desired effects and appreciably larger amounts decrease the partial pressure of hydrogen in the closed hydrogenation system to such an extent that hydrogenation proceeds only very slowly. As in the case of acid hydrogenation, either an ester or an alcohol may be formed, depending on the degree of hydrogenation; so in the case of amide hydrogenation the conditions may be regulated to give either a substituted amide or an amine from a simple unsubstituted acid amide.

In the present invention it is preferable to use a solvent which will not react with any of the materials employed in the process and will not be affected by hydrogenation catalysts at high temperatures and pressures. However, the reduction may be carried out in the absence of a solvent with a lower yield of primary amines and increased yields of substituted amides and secondary and tertiary amines. The tendency of amines to react with themselves in the presence of hydrogenation catalysts is well known and this reaction is favored in the absence of a solvent. As solvents, an inert water-miscible solvent such as dioxane may be used. Other ethers such as dibutyl ether and the alkyl ethers of ethylene glycol, and cyclic and straight chain hydrocarbons may also be used as suitable solvents. Alcohols, although operable, are not generally desirable because of the tendency to form alkylated amines by the reaction of the amines formed and the alcohol employed as a solvent. The preferred solvent is decahydronaphthalene, although other hydrocarbon solvents such as benzene, toluene, cyclohexane, water-white mineral oil, and other fractions of paraffin hydrocarbons may be used with good results.

Depending upon the particular materials used and the degree of hydrogenation desired, the processes of the present invention may be carried out either in a liquid phase static system or in a vapor or liquid phase system suitably adapted to continuous flow. The temperature employed may vary from 200 to 450° C., with a preferred temperature range of 240 to 325° C. The hydrogen pressure may vary from 10 atmospheres to 600 atmospheres, with a preferred pressure range of 100 to 300 atmospheres. It is likewise desirable to employ a reasonable excess of hydrogen during the hydrogenation process; for example, in the continuous process a molal excess of from 2 to 10 times the theoretical amount is conveniently employed.

Whereas the critical factors in the hydrogenation of amides are the use of high temperatures and high pressures, it follows that the catalyst may consist of any suitable hydrogenating metals or metallic oxides. Catalysts found suitable for the synthesis of methanol from water gas are, in general, also suitable for the hydrogenation of amides. For example, I may use reduced metals such as silver, copper, tin, cadmium, lead, iron, cobalt, or nickel. Metallic catalysts may be promoted with oxide promoters such as manganese oxide, zinc oxide, magnesium oxide or chromium oxide. These promoted catalysts may be physical mixtures or chemical compounds containing copper, e. g., copper chromate or chromite. A metallic catalyst in the form of a powder may be used, in which case it is advisable to employ a suitable supporting material such as silica, activated carbon, alumina, or a naturally occurring earth such as kieselguhr. It has been found that elementary nickel or cobalt supported on kieselguhr and prepared by reduction of the hydroxide or carbonate may be used for the hydrogenation of amides and ammonium salts provided a sufficiently high temperature and pressure are used.

Certain metallic oxides belonging to the class known as difficultly reducible oxides and having both hydrogenating and aminating propensities may be employed. By the term "difficultly reducible" is meant that the oxides are not substantially reduced to metal by prolonged exposure in a state of purity to the action of hydrogen at atmospheric pressure and at a temperature of 400 to 450° C. Such oxides suitable for the hydrogenation of amides are zinc oxide, manganese oxide, magnesium oxide, etc. These oxides may be employed either alone or in combination with each other or with other oxides which have a promoting action. Preferably the oxide employed as a promoter for the hydrogenating oxide has little activity of itself or is much less active than the hydrogenating oxide employed with it, but it yet serves to further promote the activity of the more active oxide.

It will be noted that the hydrogenating oxides are, in general, of a basic character. The promoting oxides are preferably chosen from the group consisting of the more acidic oxides of elements selected from the higher groups of the Periodic Table. For example, the oxides of chromium, vanadium, tungsten, titanium, and molybdenum are suitable promoters for nickel, copper, cobalt, zinc oxide or manganese oxide. Of these, chromium oxide is preferred, since it inhibits to a greater extent the tendency towards catalyzing destructive side reactions. I have found it advantageous to use chromium oxide in physical admixture or in chemical combination, e. g., as a chromate or chromite, with a large number of oxides ordinarily regarded as easily reducible. The acidic promoting oxides other than chromium oxide may also be used either in physical admixture or in chemical combination, e. g., as tungstates, vanadates, molybdates, etc. The reducible oxides such as copper oxide, when combined or otherwise associated with chromium oxides, are only partially reduced under conditions of operation and are found to be very effective catalysts for the hydrogenation of amides to amines. Catalysts consisting of both reduced metals and non-reduced oxides are active even though the reaction is carried out at a temperature above the fusion point of the metal. Such mixed catalysts are conveniently employed initially in the form of chromates or chromites of the metals. Manganese oxide-chromium oxide mixtures are also suitable as well as copper oxide in combination with chromium oxide or other acidic oxides.

As indicated in the examples success has attended the use of mixtures of the chromites of two or more hydrogenating materials. The multiple chromite catalyst compositions described in the examples and disclosed in my application Serial No. 470,238, filed July 23, 1930, are eminently suited to use in the present invention. The multiple chromite catalyst compositions described in said application may be prepared by precipitation of a mixture of chromates from solution by adding an alkali metal chromate to an aqueous solution of a mixture of hydrogenating metal salts, followed by ignition or by high temperature treatment with hydrogen. In conducting the hydrogenation of amides by the continuous vapor phase method, I prefer to use a chromite composition consisting substantially of zinc chromite but containing lesser quantities of the chromates or chromites of copper and cadmium. The activity of chromite catalysts may be further enhanced by subjecting the ignited chromites to an acid extraction process which serves to remove from the composition a portion of the hydrogenating metallic oxide which is not combined with the promoter oxide.

The advantages attending the use of difficultly reducible oxides or reducible oxides in a difficultly reducible form are several and substantial. These catalysts possess a high activity and are sturdy in character. They are relatively immune to degenerative processes such as sintering and poisoning, being thus distinguished from metal catalysts which deteriorate rapidly when subjected to excessive heating.

I wish to make special mention of the utility of catalysts containing copper oxide promoted by chromium oxide either in physical mixture or in chemical combination as copper chromate or copper chromite. This catalyst is particularly useful for liquid phase amide hydrogenation reactions. The conventional type of supported reduced ferrous metal catalysts, especially those containing nickel, are also eminently suited to the hydrogenation of amides to amines by the liquid phase batch method.

The catalysts described above may be further modified or promoted by the addition of oxides or carbonates of alkali metals or of alkaline earth metals, or of basic compounds of alkali metals or of alkaline earth metals, for example, barium hydroxide, sodium carbonate, calcium carbonate, and magnesium oxide. Other suitable promoters are compounds containing an alkali or alkaline earth metal combined with the acid radical of an oxygen-containing acid, e. g., barium chromate.

In carrying out the processes of this invention, I may use from 2 to 10% by weight of catalyst, depending upon the specific catalyst composition, the particular type of equipment used and upon other conditions such as temperature and pressure.

Prior to the discovery of the processes of the present invention the amines corresponding to the acids found in the naturally occurring fats have been more or less laboratory curiosities and have been prepared in low yields only by tedious processes involving a large number of chemical steps. By means of the novel methods herein described these amines, as well as numerous other organic amines, have now been made readily available for important applications in the arts.

As many apparently widely different embodiments of this invention may be made without departing from the spirit and scope thereof, it is to be understood that I do not limit myself to the specific embodiments thereof except as defined in the appended patent claims.

I claim:

1. The process which comprises maintaining a mixture of lauramide, hydrogen, decahydronaphthalene and a nickel catalyst at a temperature between 200° and 280° C. and under a pressure of about 3000 to about 4000 pounds per square inch for sufficient length of time to effect a reduction of the amide group to the amine group and recovering the dodecylamines formed.

2. The process which comprises bringing a mixture of phthalimide, dioxane and hydrogen into contact with a nickel-containing catalyst at a temperature of about 265° C. and under a pressure of about 3000 pounds per square inch for sufficient length of time to effect a reduction of the imide group to the amine group.

3. The process of hydrogenating amides and imides, which comprises heating a compound selected from the class consisting of amides and imides, while admixed with hydrogen, to a temperature of at least about 225° C. and at a pressure of at least 10 atmospheres while in contact with a nickel catalyst supported on an inert carrier.

4. The process in accordance with claim 3 characterized in that the catalyst is nickel supported on kieselguhr.

5. The process in accordance with claim 3 characterized in that the reaction is carried out in the presence of an inert solvent.

6. The process in accordance with claim 3 characterized in that the reaction is carried out in the presence of an inert solvent and the catalyst is nickel supported on kieselguhr.

7. The process which comprises bringing a compound selected from the class consisting of amides and imides under catalytic hydrogenation conditions at a temperature of at least about 225° C. and at a pressure of at least 10 atmospheres, while in contact with a hydrogenation catalyst containing nickel as an essential catalytic component.

8. The process in accordance with claim 7 characterized in that the compound treated is a long-chain aliphatic amide.

WILBUR A. LAZIER.